May 7, 1968  E. DERHAMMER  3,381,933

AUTOMATIC SAFETY CUT-OFF VALVE

Filed Dec. 28, 1965

INVENTOR.
ELI DERHAMMER
BY
Arthur H. Seem Horn
ATTORNEY

United States Patent Office 3,381,933
Patented May 7, 1968

3,381,933
AUTOMATIC SAFETY CUT-OFF VALVE
Eli Derhammer, 127 S. Market St.,
Lodi, Ohio 44254
Filed Dec. 28, 1965, Ser. No. 516,847
5 Claims. (Cl. 251—73)

My invention relates to an automatic safety cut-off valve and more particularly to such devices which may be employed in fluid fuel lines supplying fuel to a burner for heating liquids or gases such as are employed in heating systems including hot water, air and steam systems and which are responsive to fluid pressures generated by the heated medium in excess of a pre-determined safety valve to shut off fuel supply to the burner.

It is an object of this invention to construct an improved pressure responsive valve shut-off safety means of simple design for attachment to a shut-off valve in the fluid fuel supply line connected to a burner, particularly such as the gas line to a burner employed in hot water, steam or hot air heating systems in both domestic and industrial installations.

Another object of this invention is to provide means for automatically closing the fuel feed valve to a burner and which is positive in its action to completely and effectively shut off the valve in response to the build-up of pre-determined excessive and dangerous pressures in the enclosure housing the heat transfer medium being heated.

A further object of this invention is to provide an extremely high degree of safety in the operation of a hot air, steam or hot water heating system particularly those employing well known devices such as a pressure relief pop-off valve or the like designed merely for use in relieving excessive and dangerous pressures which may build up in the heating chamber as a result, for example, of failure of conventional temperature responsive means to close the fuel supply valve at the burner or, on the other hand, because of defective operation of the supply valve, per se.

Still another object is to construct an automatic safety fuel cut-off valve of the type designed herein which is economical to manufacture, easy to install in a fuel supply line and which may easily be reset manually to valve-open position subsequent to the valve being actuated to close the fuel supply to the burner, without the necessity of dismounting or disassembling the supply valve from the line for such purpose.

Still another object of the invention is to provide means which can readily be secured to a conventional plug type valve by removing the valve stem assembly and cap and replacing it with my present safety attachment, thus affording automatic means for closing the valve supplying fuel to the burner by which said means is effectively actuated in response to dangerous and excessive pressures building up exteriorly of the fuel supply line such as those generated within the heating chamber.

Other objects and advantages of this invention will become more apparent as the following description of the same progresses, reference being made to the accompanying drawings in which like parts are designated by like reference characters throughout the same.

My invention is directed essentially to a simple means which may readily be attached to a conventional valve such as those employed in fuel supply lines, the embodiment shown in the accompanying drawing being illustrative of its use in a fuel supply line serving a burner such as may be employed in domestic or industrial hot water, air or vapor heating systems. As an attachment to a conventional fuel supply valve, it is only necessary to remove the cover nut from the valve casing, remove the valve stem and handle insert and then insert the stem and handle unit of the automatic shut-off attachment into the valve casing and then replace the cover or cap nut to secure the attachment in operative position in the valve body.

Figure 1:
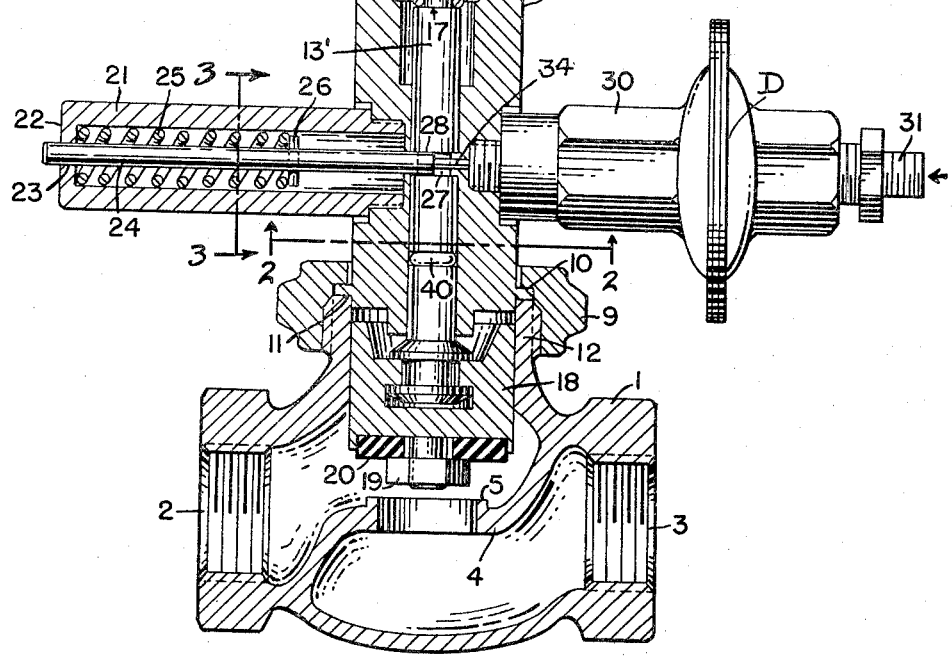
FIGURE 1 is a vertical section through a fuel cut-off valve means embodying my invention, some of the parts being shown in elevation.

In carrying out my invention, reference being made to the embodiment shown in the drawing, a conventional fuel line valve body is indicated at 1. The valve shown is of the plug type, having threaded outlet and inlet openings 2 and 3, respectively, arranged on opposite sides of a partition 4 formed with a valve seat 5. The handle and valve stem 6 and 7 are supported in a cylindrical member 8 for axial movement therein and this member, when in place as shown in FIGURE 1, is clamped to the valve body 1 by means of the nut 9 engaging the flange 10 overlying the top edge 11 of the valve body neck 12. The stem is provided with an upper section 13 which is integral with a lower section 13' of greater diameter than that of the upper section and these sections pass through an opening in the adjustable extension 14 threaded into the upper end of the member 8 and an aligned opening in the member 8, respectively, for axial movement therein. A compression spring 15 is housed within the extension, one end of the spring abutting the upper radially disposed wall 16 of the extension while its opposite end engages or abuts the shoulder 17 of the larger diameter lower section 13' of the valve stem to normally exert its force of compression downwardly against the shoulder.

The lower section 13' of the stem may be formed to receive a valve head 18 in a conventional manner, as shown, and removably attached to the undersurface of the head, by means of a nut 19, is a gasket or seal 20 of suitable material in position to effectively engage the seat 5 and seal against the flow of fuel between the passages 2 and 3. Clearance between the head and the lower portion of the member 8 is provided to allow sufficient axial movement of the stem and head 18 to fully open and close the seat 5.

I have provided exceedingly simple means whereby the valve may be closed instantaneously to cut off the fuel supply to a burner in response to a predetermined pressure condition in the heating chamber, which, under operating conditions, could become dangerous to life and property if the predetermined condition exceeded a selected value as, for instance, where pressure in a boiler or hot water storage tank builds up to a dangerous predetermined value.

In carrying out this feature of the invention, there is provided a removable cylindrical spring and plunger housing 21 threadedly secured in the member 8 in a chordal direction thereto, i.e. its axis passes to one side of the axis of the pin section 13'. The housing 21 has an outer end 22 provided with an axially disposed opening 23 for slidably supporting one end of a plunger 24. A compression spring 25 located in the housing abuts at one end with the end wall 22 and at its other end with a cross pin 26, thereby keeping the spring under sufficient compression at all times to normally thrust and urge the plunger 24 toward the right in FIGURES 1, 2 and 3 into interlocking or latching engagement with the walls of an annular groove formed in the stem section 13'.

Figure 2:
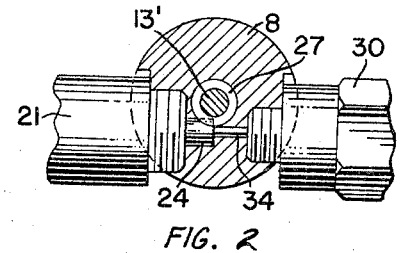
FIGURE 2 is a horizontal section taken on line 2—2 looking in the direction of the arrows.

The lower stem section 13' is provided with an annular groove 27 of sufficient width to receive, with only slight clearance, the inner end portion of the plunger 24, as at 28 in the position shown in FIGURES 1 and 2. In this position, it will be seen that the valve head 18 is held off the seat 5, thus allowing free flow of fuel through the partition and to the burner to which it is connected.

Also offset axially to the axis of the valve stem 13' and removably secured to an opposite side of the body 8 and in axial alignment with the plunger 24 is a casing or cylinder 30 having incorporated therein a transversely arranged pressure responsive diaphragm device D of conventional design. The fitting 31 is for connection with a conduit, such as at 32 in FIGURE 4, having communication with a pressure chamber in the hot water storage tank 33.

Figure 3:
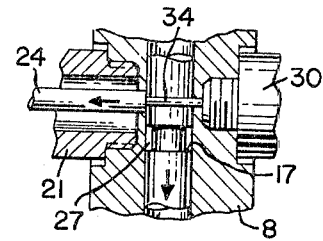
FIGURE 3 is a section taken on line 3—3 looking in the direction of the arrows.

A plunger tripping pin 34 is axially movable in the casing 30 and projects to abut the inner end of the plunger 24. The plunger and pin are in axial alignment, but it is to be noted that only the inner end of the plunger extends into the groove 27 when the valve head 18 is off the seat 5, while the plunger tripping pin 34, being of small diameter in cross section, does not enter or intersect the groove 27. This is illustrated in FIGURES 2 and 3 showing respectively the parts in valve open and closed positions.

The diaphragm is not shown in detail since it is of conventional construction. The tripping pin is connected at its inner face to the diaphragm and is actuated axially thereby in response to flexing of the diaphragm under the influence of pressures acting against the diaphragm in the direction of the arrow in FIGURE 1.

An O-ring seal 40 may be provided and seated in a circumferential groove in the stem 13' below the groove 27 to prevent pressure loss along the stem 13' toward the valve head, and to prevent leakage of fluid upwardly into the groove 27, the housing 21, the upper portion of the housing 8 and into the extension 14.

Figure 4:
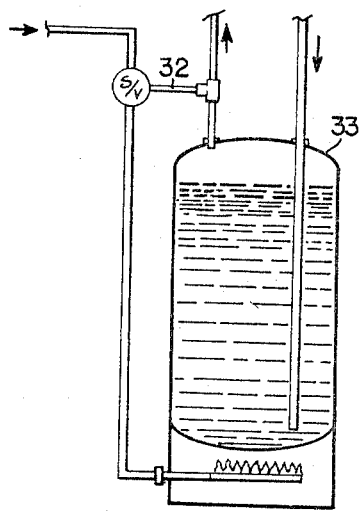
FIGURE 4 is a diagrammatic view showing my invention applied in use to a fuel line supplying fuel to a burner for heating water or other liquid as being illustrative of one form and use of the present invention, other similar uses being in connection with boilers or hot air heating systems.

While I have illustrated my invention in use in FIGURE 4 as applied to a hot water storage tank which is underfired, the invention is equally well suited for use in other systems as steam, vapor or even hot air systems. For instance, in each system, the conduit 32 may be connected with a selected oil filled cell (not shown) disposed in the plenum chamber of the hot air furnace or boiler where, in response to a selected rise in temperature in the chamber, the oil will be expanded to exert a corresponding pressure through the conduit 32 resulting from expansion of the oil, and this pressure is exerted against the diaphragm in the pressure responsive device D to actuate the plunger tripping pin 34 and thus eject the locking plunger 24 from the annular groove 27 allowing the valve head to be thrust against the seat 5 instantaneouly shutting off the fuel to the burner.

In order to select a pressure or temperature value to which the safety cut-off valve will respond to close the fuel line to the burner, interchangeable compression springs 25 may be selected to exert selected thrust axially of the plunger 24 which, when opposed by a thrust or pressure exceeding that of the spring 25 and exerted on the pin 34 corresponding to the fluid pressure applied to the diaphragm through the conduit 32, the latching plunger will be dislodged from the groove 27 allowing the valve stem to be thrust downwardly by the compression of the spring 15 to thus close the cut-off fuel supply valve.

The foregoing description and accompanying drawing are considered as illustrative only of the principles of the invention and the automatic safety cut-off valve of the present invention is not to be regarded as limited by the above described embodiments. Alternative arrangements of parts, substitution of materials and other organization and assembly procedures, apparent to those skilled in the art, may be employed without departing from the scope and spirit of the invention as claimed.

I claim:

1. An automatic safety fuel shut-off attachment for replacing a conventional valve stem and valve head in a plug type fuel valve body having a seat for the valve head and a valve stem supporting closure nut, said attachment comprising a cylindrical member, a valve stem axially movable in the member, a valve head on said stem for seating on the valve seat, compression means in the member for normally urging the head to seating position, said stem having a circumferentially arranged groove formed therein for receiving a latching plunger, a cylindrical housing carried by the said member, a latching plunger axially movable in the housing and having one end extending beyond the cylindrical housing, compression means in the cylindrical housing exerting its force of compression axially on the plunger to project an end of the plunger into the groove of the stem when the same are in alignment as when the valve is open, a fluid pressure responsive means for communication with a source of fluid pressure and secured in said valve stem cylinder, a tripping pin actuated by said means and having one end projecting toward said plunger end whereby in response to a predetermined pressure value imposed on said pin sufficient to overcome the thrust on said plunger, said plunger will be disengaged from the stem groove to seat the valve head on the valve seat and shut off the flow of fuel through the valve, and a handle on the stem to manually return the valve to open position.

2. The invention as defined in claim 1 in which the axes of the plunger and the tripping pin are in co-alignment.

3. The invention as defined in claim 1 in which the aligned axes of the cylindrical housing and latching plunger and the tripping pin are disposed transversely of the valve stem axis to permit the plunger end to enter the groove when the stem is raised to unseat the valve head from its seat, but to release the stem to valve closed position when said plunger is ejected from the groove as a result of a predetermined excessive thrust imposed on said pin in the direction of the plunger.

4. The invention as defined in claim 1 in which the diameter of the said plunger end is substantially the width of the groove to permit entry of the plunger thereinto, and in which the diameter of the pin lies entirely outside the walls defining the groove.

5. The invention as defined in claim 1 in which the cylindrical housing is removably attached to said valve stem cylindrical member to operatively receive a compression spring for exerting a selected thrust axially of the plunger to be overcome by a pressure imposed by the fluid pressure responsive means.

References Cited

UNITED STATES PATENTS

| | | | |
|---|---|---|---|
| 2,149,295 | 3/1939 | Jobson | 137—463 |
| 2,397,518 | 4/1946 | Allison | 251—73 X |
| 2,638,928 | 5/1953 | Stadler | 251—73 X |
| 2,718,899 | 9/1955 | Goddard | 137—463 |
| 2,884,222 | 4/1959 | Oakes | 251—73 |
| 2,927,603 | 3/1960 | Willis | 137—463 X |
| 3,228,417 | 1/1966 | Schwerter | 251—73 X |

FOREIGN PATENTS 532,623   8/1955   Italy.

M. CARY NELSON, *Primary Examiner.*

ROBERT C. MILLER, *Examiner.*